M. J. HAMMERS.
AUXILIARY SEAT FOR VEHICLES.
APPLICATION FILED OCT. 11, 1915.
1,320,854.
Patented Nov. 4, 1919.
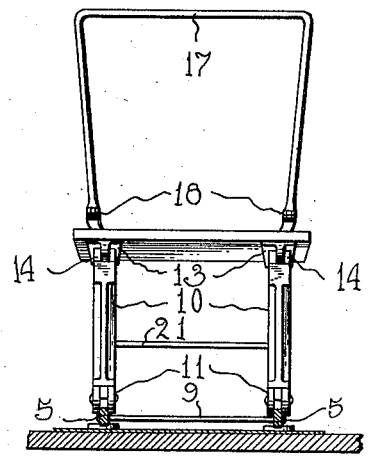
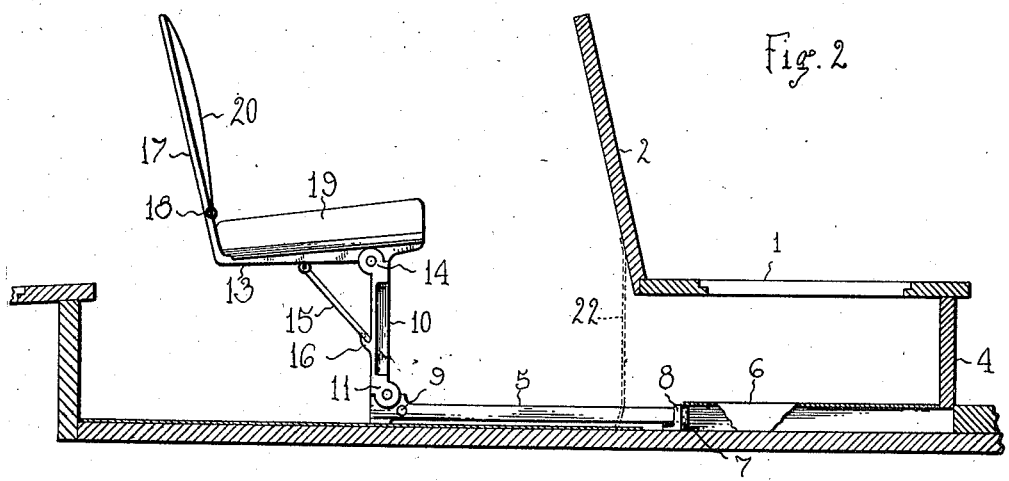
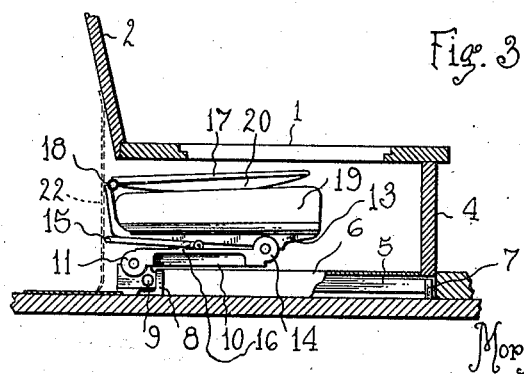
Witnesses
Arthur F. Draper
Karl H. Butler
Inventor
Morgan J. Hammers
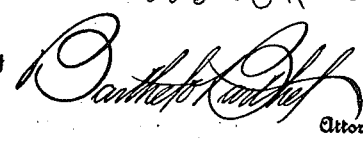
Attorneys

UNITED STATES PATENT OFFICE.

MORGAN J. HAMMERS, OF DETROIT, MICHIGAN.

AUXILIARY SEAT FOR VEHICLES.

1,320,854.          Specification of Letters Patent.        Patented Nov. 4, 1919.

Application filed October 11, 1915. Serial No. 55,137.

*To all whom it may concern:*

Be it known that I, MORGAN J. HAMMERS, a citizen of the United States of America, residing at Detroit, in the county of Wayne and State of Michigan, have invented certain new and useful Improvements in Auxiliary Seats for Vehicles, of which the following is a specification, reference being had therein to the accompanying drawings.

In equipping a vehicle with spare seats that are not always in use, it is advisable that they be concealed when not in position for occupants, and that the entire space occupied by them when in use be free and unobstructed when the seats are so removed. It is also desirable that the seats be readily swung into position without having to lift them bodily or without the necessity of the use of clamps or bolts to retain them in position.

This invention relates to auxiliary seats in vehicles and to an arrangement thereof whereby they are readily swung out of concealment into position and held in usual condition without the use of a tool or a clamping bolt while the space they occupy is entirely unobstructed and clear when the seats are collapsed.

The invention consists in the matters hereinafter set forth and more particularly pointed out in the appended claim.

In the drawings,

Figure 1 is a view, partially in front elevation and partially in transverse section, of a seat that embodies features of the invention mounted on the body of a vehicle;

Fig. 2 is a view, partially in longitudinal section and partially in elevation and diagrammatic, of a vehicle body provided with a seat that embodies features of the invention in open position, and Fig. 3 is a view, partially in side elevation and partially in longitudinal section, showing the seat in collapsed and concealed position.

Referring to the drawings, the front seat deck 1 of a vehicle has that portion of the back 2 below the seat platform cut out thereby affording access to the space below the seat behind the heel board 4. A pair of flanged and ribbed horizontal members 5 slide under guides 6 that are disposed beneath the seat deck 1 of the front seat on the vehicle floor. A lateral enlargement or projection 7 on the forward end of each member coöperates with a suitable retaining member 8 that loops over the guide, to prevent the latter from completely withdrawing. A tie member 9 hold the parts 5 in spaced relation.

A seat post 10 is connected to each member 5 by a forwardly breaking rule joint indicated at 11 and of suitable design, that permits the seat post to be turned up into upright position or folded forward upon the member 5.

A seat iron 13 is connected by a downwardly breaking rule joint 14 on each post 10 so as to be in substantially horizontal position when extended, a brace member 15 that is pivoted to the seat and locked into a suitably formed extension 16 on each post 10, holding the parts in extended position.

A back frame 17 is pivoted by a forwardly breaking rule joint 18 to the seat body, in this case the connection being made directly to the member 13 although this is not necessary. Seat upholstery 19 and back upholstery 20 complete the structure.

When not in use, the post 10 folds down into parallel relation with the members 5, the rule joints 11 maintaining them in sufficient spaced relation, as plainly indicated in Fig. 3, to permit the seat to be moved forward under the regular front seat as also indicated in Fig. 3, the back 17 being dropped upon the seat. When extended the parts assume the position in Fig. 2, the operator merely pushing the brace 15 which may be single or may be one for each post, cross connected by a suitable rod such as indicated at 21, to drop into the lug 16. A flexible apron 22 or the like conceals the folded seat and preserves it from dust.

A seat is thus obtained which, when it is extended, occupies the space between the front and back seats of a vehicle and permits ready ingress and egress, and when folded and moved under the front seat leaves the deck of the vehicle between the two seats unobstructed.

Obviously, changes in the details of construction may be made without departing from the spirit of my invention and I do not care to limit myself to any particular form or arrangement of parts.

What I claim is:—

In an automobile having a pair of fixed seats in spaced relation, a seat deck at an interval above the floor, guides disposed under the seat deck longitudinally of the car, a pair of flanged bars each in sliding engagement with the guides beneath the deck, a retaining loop at the end of each guide bar embracing the slide, an extension on the forward end of each flanged member engaging the retaining member when the flanged member is retracted, a seat post connected by a forwardly breaking rule joint to each flanged member to extend forward thereof and in parallel relation thereto under the deck when folded down, a seat arm mounted on each post by a downwardly breaking rule joint, a brace member pivoted to the seat arm and adapted to lock into an extension on each post when the parts are in extended position, a back frame pivoted by forwardly breaking rule joints to the seat arms, and a seat and a back appropriately mounted on the parts.

In testimony whereof I affix my signature in presence of two witnesses.

MORGAN J. HAMMERS.

Witnesses:
 ANNA M. DORR,
 C. R. STICKNEY.

Copies of this patent may be obtained for five cents each, by addressing the "Commissioner of Patents, Washington, D. C."